United States Patent
Fischer et al.

(10) Patent No.: US 8,608,606 B2
(45) Date of Patent: *Dec. 17, 2013

(54) TRANSMISSION DEVICE HAVING POWER SPLITTING

(75) Inventors: Roland Fischer, Oberteuringen (DE); Michael Siber, Nusplingen (DE); Robert Morrison, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/522,577

(22) PCT Filed: Dec. 17, 2010

(86) PCT No.: PCT/EP2010/070041
§ 371 (c)(1),
(2), (4) Date: Jul. 17, 2012

(87) PCT Pub. No.: WO2011/098180
PCT Pub. Date: Aug. 18, 2011

(65) Prior Publication Data
US 2012/0302389 A1    Nov. 29, 2012

(30) Foreign Application Priority Data
Feb. 9, 2010  (DE) .................. 10 2010 001 698

(51) Int. Cl.
*F16H 47/04* (2006.01)
(52) U.S. Cl.
USPC ............................... 475/80; 475/218

(58) Field of Classification Search
USPC ................. 475/1, 6, 72, 74, 80, 218, 329
See application file for complete search history.

(56) References Cited

U.S. PATENT DOCUMENTS

| | | | |
|---|---|---|---|
| 6,039,666 A * | 3/2000 | Okuda et al. ................ 475/72 |
| 8,262,530 B2 * | 9/2012 | Bailly et al. ................ 475/217 |
| 8,460,147 B2 * | 6/2013 | Legner ........................ 475/207 |
| 2002/0035833 A1 * | 3/2002 | Otten .......................... 60/454 |
| 2008/0085801 A1 * | 4/2008 | Sedoni et al. ............... 475/72 |
| 2009/0270212 A1 * | 10/2009 | Ueda et al. ................. 475/74 |

(Continued)

FOREIGN PATENT DOCUMENTS

| | | |
|---|---|---|
| DE | 10 2007 047 194 A1 | 4/2009 |
| DE | 10 2007 047 195 A1 | 4/2009 |

(Continued)

*Primary Examiner* — Erin D Bishop
*Assistant Examiner* — Huan Le
(74) *Attorney, Agent, or Firm* — Davis & Bujold, PLLC; Michael J. Bujold

(57) ABSTRACT

A transmission device having power splitting. In the first driving range, the mechanical power branch transmits torque from the ring gear to the additional fixed gear by the fixed gear. In this case, power branches from the ring gear. The hydrostatic power branch branches from the second sun gear. The hydrostatic branch transmits power from the first to the second hydraulic unit. The first and second hydraulic units act respectively as a pump and a motor. On one of the hydrostatic shafts, the mechanical and hydrostatic powers are added and transmitted to the output. In the second driving range, power from the planet carrier partially branches to the ring gear and passes to the hydrostatic shaft for the second hydraulic unit. An auxiliary shaft can be coupled by a gear to a fixed gear operatively connected to a shaft of the power splitting device.

12 Claims, 1 Drawing Sheet

(56) References Cited

U.S. PATENT DOCUMENTS

| | | |
|---|---|---|
| 2010/0197438 A1 | 8/2010 | Legner |
| 2010/0204001 A1 | 8/2010 | Legner |
| 2010/0209260 A1 | 8/2010 | Legner |
| 2010/0210389 A1 | 8/2010 | Legner et al. |

FOREIGN PATENT DOCUMENTS

| | | | | |
|---|---|---|---|---|
| DE | 10 2007 047 511 A1 | 4/2009 | | |
| DE | 10 2007 047 513 A1 | 4/2009 | | |
| DE | 10 2008 001 613 A1 | 11/2009 | | |
| DE | 10 2008 040 443 A1 | 1/2010 | | |
| DE | 10 2008 040 449 A1 | 1/2010 | | |
| DE | 102008040443 A1 * | 1/2010 | ............ | F16H 47/04 |
| WO | 2009/047037 A1 | 4/2009 | | |
| WO | 2009/047038 A1 | 4/2009 | | |

* cited by examiner

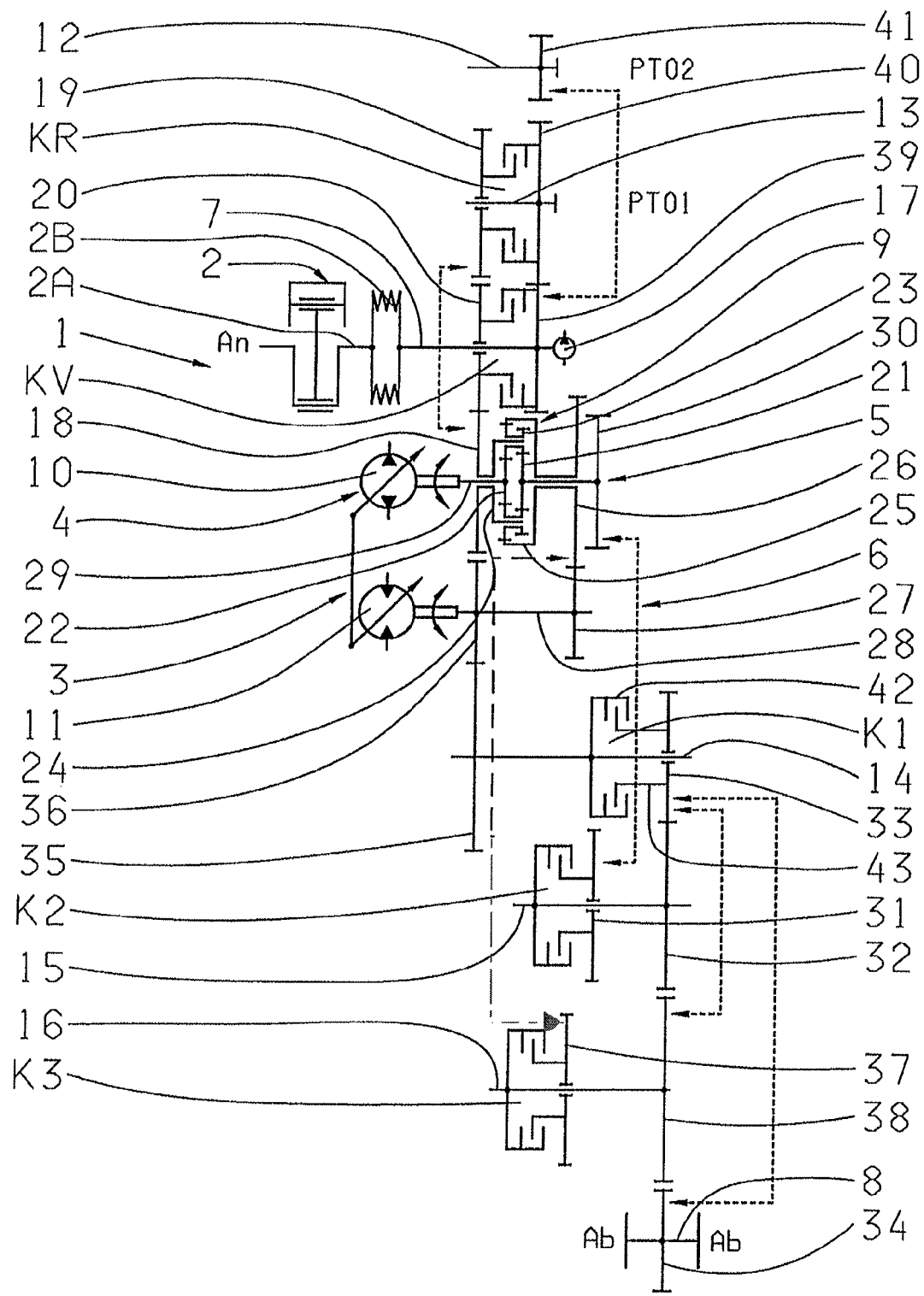

TRANSMISSION DEVICE HAVING POWER SPLITTING

This application is a National Stage completion of PCT/EP2010/070041 filed Dec. 17, 2010, which claims priority from German patent application serial no. 10 2010 001 698.5 filed Feb. 9, 2010.

FIELD OF THE INVENTION

The invention relates to a transmission device having power splitting.

BACKGROUND OF THE INVENTION

A power split transmission, in particular for a working machine such as a wheel loader, is known from DE 10 2007 047 194 A1 and has a hydrostatic power branch and a mechanical power branch. The power branches are added by means of a summing transmission, wherein a reversing transmission is connected upstream of the summing transmission and a gear shifting transmission is connected downstream of the summing transmission.

Two driving ranges for forward driving and two driving ranges for reverse driving can be provided by means of the power split transmission, within which driving ranges the gear ratio of the power split transmission can be continuously varied by means of a hydrostatic device. The driving ranges can be switched by disengaging a shift element that is engaged and by engaging a shift element that is disengaged.

Disadvantageously, a shift element designed to provide a second driving range of the power split transmission is arranged on a hydrostatic shaft of the hydrostatic device, and therefore a connection of the hydrostatic shaft to a mechanical power branch requires a complex design. This is the result, among other things, of the fact that the hydrostatic device is normally supported by means of an elastic rubber bearing device for vibration damping and therefore an axial offset that varies during operation must be compensated by an appropriate jointed connecting device in the connection region between the hydrostatic device and the mechanical power branch. However, without additional design measures, this permanent compensation in turn causes excitation of vibrations to an undesired extent in the region of the shift element arranged on the hydrostatic shaft and an increase in the tendency to sway.

Furthermore, the power split transmission is characterized by a high installation space requirement due to the arrangement of the shift element on the hydrostatic shaft, because the two hydrostatic shafts of the hydrostatic device must be arranged at a certain distance from each other so that the installation space required for installing the shift element on the hydrostatic shaft can be provided.

SUMMARY OF THE INVENTION

Therefore, the problem to be solved by the present invention is that of providing a transmission device having power splitting that requires little installation space and has a simple design.

For the transmission device having power splitting, one part of an applied torque can be transmitted between a transmission input and a transmission output in a first power branch at least by means of a hydrostatic device having at least two hydrostatic shafts, and the other part of the torque can be transmitted between the transmission input and the transmission output in a second power branch preferably by means of a mechanical device having several countershafts, the second power branch being connected to the torque by means of a power splitting device. At least two driving ranges each are provided for forward driving and reverse driving. The driving ranges can each be switched over by means of at least one shift element to be disengaged and at least one shift element to be engaged.

According to the invention, each of the shift elements is arranged on a separate auxiliary shaft, and an auxiliary shaft designed to provide an additional driving range can be coupled by means of a gear to a fixed gear, which is operatively connected to a shaft of the power splitting device.

Because the shift elements are all arranged on separate shafts and, in particular, not on a hydrostatic shaft of the hydrostatic device, the hydrostatic shaft can be operatively connected to the transmission output shaft with little design complexity.

Furthermore, the transmission device according to the invention is also characterized by a low installation space requirement, because the hydrostatic shafts of the hydrostatic device can be arranged at a smaller distance from each other as compared to the power split transmission known from the prior art.

In addition, when the additional driving range is selected, the transmission device can be operated by the additional auxiliary shaft, which can be coupled to the power splitting device by means of a fixed gear, and the power flow transmitted thereby, without a dynamically loaded freewheeling gear. Furthermore, in the transmission device according to the invention, the additional auxiliary shaft, together with a preferably associated shift element for engaging and disengaging the additional driving range, can be arranged outside of a transmission oil sump at least in some areas because of the substantially direct power tap in the region of the power splitting device, whereby splashing losses can at least be reduced.

The power splitting device, which is provided for power splitting and for adding those portions of the applied torque that can be transmitted by means of the power branches, is a transmission apparatus designed as a planetary transmission in a further advantageous embodiment of the transmission device according to the invention, the planetary transmission having two sun gears, which engage with common double planet gears, which in turn mesh with a ring gear. A planetary transmission device having a small installation space in the radial direction can be arranged in a simple manner next to additional coaxially arranged gears, which engage with additional gears that are supported on auxiliary shafts arranged in parallel. The low radial installation space requirement allows the various gear pairs to be arranged so as to minimize the installation space in the axial direction, whereby the transmission device requires little installation space overall in the axial direction.

If the gear of the auxiliary shaft designed to provide the additional driving range engages with a fixed gear rigidly connected to the ring gear of the power splitting element or with a fixed gear that meshes therewith, a dynamically loaded freewheeling gear is easily avoided by means of a simple design when an additional driving range is engaged.

In a further advantageous embodiment of the transmission device according to the invention, a shift element half connected to the associated auxiliary shaft, preferably the inner disk carrier, of a first shift element, by means of which the first driving range can be provided in the engaged operating state of the shift element, is operatively connected to a transmission output shaft by means of a gear of the auxiliary shaft. It is thereby achieved with little design complexity that there is a low tendency to sway at high driving speeds in the region of the first shift element and drag torques resulting therefrom in the region of the first shift element, which degrade the efficiency of the transmission device, are reduced or thermal destruction of the clutch is avoided.

In a further embodiment of the transmission device according to the invention having a simple design, the gear that can be connected to the associated auxiliary shaft in a rotationally fixed manner by means of the first shift element is operatively connected to the transmission output shaft, and the fixed gear of the auxiliary shaft meshes with a fixed gear of the hydrostatic shaft associated with the hydrostatic device.

An outer disk carrier of the first shift element is connected to the auxiliary shaft, and the inner disk carrier is connected to a gear that can be coupled to the associated auxiliary shaft by means of the first shift element.

In a further advantageous embodiment of the transmission device according to the invention, a freewheeling gear that can be connected to the associated auxiliary shaft in a rotationally fixed manner by means of a second shift element, by means of which the second driving range can be provided in the engaged operating state of the second shift element, meshes with a fixed gear connected in a rotationally fixed manner to the first sun gear of the transmission apparatus, and a fixed gear of the auxiliary shaft is operatively connected to the gear of the auxiliary shaft associated with the first shift element, whereby the second driving range can be provided with a low number of tooth meshes in the mechanical device.

In an advantageous development of the transmission device according to the invention, an additional shift element arranged on an additional auxiliary shaft of the preferably mechanical second power branch is designed to provide a third driving range, which additional auxiliary shaft can be integrated into the existing concept of the transmission device according to the invention without complex design measures, whereby the transmission device according to the invention is characterized by high modularity and can be adapted to various applications in a simple manner.

In a further advantageous embodiment of the transmission device according to the invention, a freewheeling gear that can be connected to the associated auxiliary shaft in a rotationally fixed manner by means of the third shift element, by means of which the third driving range can be provided in the engaged operating state of the third shift element, meshes with an additional fixed gear of the hydrostatic shaft associated with the hydrostatic device, and a fixed gear of the auxiliary shaft is operatively connected to the transmission output shaft, whereby the third driving range likewise can be provided with the lowest possible number of tooth meshes in the mechanical device.

In a first driving range and a third driving range of the transmission device, the power of the two power branches can be added by means of a shaft connected to the hydrostatic device.

A fixed gear of a transmission input can be connected to a hydraulic pump of a first working hydraulic system by means of a fixed gear of a further auxiliary shaft and to a hydraulic pump of a second working hydraulic system by means of a fixed gear of an additional auxiliary shaft, wherein the hydraulic pumps can be driven at the same rotational speed or at different rotational speeds depending on the gear ratios between the fixed gear of the transmission input shaft and the fixed gears of the further auxiliary shafts.

An embodiment of the transmission device according to the invention that can be operated using a simple design and with little complexity is characterized in that the transmission input can be operatively connected to the planet carrier of the planetary transmission by means of driving direction shift elements.

In a further advantageous embodiment, the driving direction shift elements, which are arranged between the transmission input and the transmission apparatus or planetary transmission, can be switched over between a mode for forward driving and a mode for reverse driving. Thus, a vehicle having the transmission device according to the invention can be operated in both the forward and reverse driving directions using a simple design and with little open-loop and closed-loop control complexity.

In order to be able to adapt the transmission device according to the invention to an installation space available in the vehicle with little design complexity, either the fixed gears are arranged between the driving direction shift elements and a transmission input or the driving direction shift elements are arranged between the fixed gears and the transmission input.

An embodiment of the transmission device that can be operated with little open-loop and closed-loop complexity is designed with at least one first hydraulic unit, which can be operated as a pump and as a motor, and at least one second hydraulic unit, which is operatively connected thereto by means of a hydraulic circuit and which likewise can be operated as a motor and as a pump, in the hydrostatic device of the first power branch, the two hydraulic units both being adjustable and preferably designed as bent-axis units.

In order to be able to continuously vary the gear ratio of the transmission device according to the invention both within a driving range and across all driving ranges, a consumption displacement and a pumping displacement of the hydraulic units can be varied in a range from 0% to 100% in an advantageous embodiment of the transmission device, wherein the applied torque is transmitted completely by means of the first power branch having the hydrostatic device at the maximum consumption displacement of one hydraulic unit and minimum pumping displacement of the other hydraulic unit and completely by means of the second power branch having the mechanical unit at the minimum consumption displacement of one hydraulic unit and maximum pumping displacement of the other hydraulic unit.

In a development of the transmission device according to the invention having a simple design, the first hydraulic unit of the hydrostatic device is connected to one of the sun gears of the transmission apparatus.

In a further embodiment of the transmission device according to the invention having a simple design, at least part of the applied torque can be applied to the second power branch having the preferably mechanical device by means one of the sun gears of the transmission device or by means of the ring gear.

If the driving range changes are to be performed synchronously in the transmission device according to the invention, the respective shift elements provided for switching among the driving ranges can be given small dimensions if the shift elements are designed as friction shift elements, because during the processes of switching among the driving ranges, only low friction work must be performed by the shift elements and therefore only little friction power arises in the shift elements.

The features indicated in the following example embodiment of the transmission device according to the invention are suitable for developing the subject matter of the invention by themselves or in any combination with each other. The combination of a given set of features does not represent a restriction on the development of the subject matter of the invention and is only essentially representative in nature.

Additional advantages and advantageous embodiments of the transmission device according to the invention can be found in subsequent example embodiments, the principle of which is described with reference to the drawing.

BRIEF DESCRIPTION OF THE DRAWING

The sole FIGURE of the drawing shows a transmission diagram of an example embodiment of the transmission device according to the invention having power splitting and having synchronous range change.

DETAILED DESCRIPTION OF THE PREFERRED EMBODIMENTS

The FIGURE presents a gear diagram of a first embodiment of a transmission device 1 having power splitting and having synchronous range change. One part of a torque applied by a drive machine 2 can be transmitted between a transmission input or a transmission input shaft 7 and a transmission output or a transmission output shaft 8 in a first power branch 3 by means of a hydrostatic device 4, and the other part of the torque can be transmitted between the transmission input or transmission input shaft 7 and the transmission output or transmission output shaft 8 in a second power branch 5 by means of a mechanical device 6. The two power branches 3 and 5 are operatively connected by means of a transmission apparatus 9, which in the present case is a transmission apparatus designed as a planetary transmission.

Arranged between a motor output shaft 2A and the transmission input shaft 7 is a so-called vibration damper 2B, by means of which rotational irregularities in the region of the drive machine 2 are damped and are introduced into the transmission device 1 and the remaining part of the drive train of a vehicle or of a construction vehicle only to a small extent.

The transmission device 1 is designed with three driving ranges for forward driving and reverse driving, which can each be switched over by means of a shift element K1, K2, or K3 to be disengaged and at least one shift element K1, K2, or K3 to be engaged.

The hydrostatic device 4 of the first power branch 3 comprises a first hydraulic unit 10 and a second hydraulic unit 11, which is operatively connected to the first hydraulic unit by means of a hydraulic circuit not shown in greater detail in the drawing. The first hydraulic unit and the second hydraulic unit are adjusted by means of a common yoke and are designed as bent-axis units. The two hydraulic units 10 and 11 can each be operated as a pump and as a motor, wherein the operating mode changes in the manner described later depending on the driving range engaged in the transmission device 1.

In addition, the transmission device 1 is designed as an auxiliary shaft transmission having several auxiliary shafts 12 to 16 arranged at a distance from each other, for which reason the transmission device 1 has a low installation space requirement in the axial direction and a high installation space requirement in the radial direction, or in the height direction in the installed position, wherein the installation space is provided in order to bridge an axis distance between the motor output shaft 2A of the drive machine 2 and the transmission output shaft 8 as well as the drive axles of the vehicle, which in the present case is designed as a wheel loader.

Two driving direction shift elements KR and KV, which can be used to switch between a mode for forward driving and a mode for reverse driving, are provided between the transmission input 7 and the planetary transmission 9. In the region of the auxiliary shaft 13 associated with the driving direction shift element KR for reverse driving, a hydraulic pump of a first working hydraulic system can be coupled and driven by means of the drive machine 2, and in the region of the auxiliary shaft 12, a hydraulic pump of a second working hydraulic system can be coupled and driven by means of the drive machine 2. For this purpose, a fixed gear 39 of the transmission input shaft 7 engages with a fixed gear 40 of the further auxiliary shaft 13 and with a fixed gear 41 of the additional auxiliary shaft 12. A transmission pump 17 driven directly by the drive machine 2 is arranged in the region of the transmission input shaft 7.

In addition to a hydraulic circuit that connects the two hydrostatic units 10 and 11 of the hydrostatic device 4 to each other, the hydraulic circuit being designed as a closed circuit, a lubricating and cooling circuit of the transmission device 1 can also be supplied with hydraulic fluid by means of the transmission pump 17. In addition, the shift elements K1 to K3 and the driving direction shift elements KR and KV can be pressurized with hydraulic operating pressure by means of the transmission pump 17 and transferred from a substantially open operating state to a substantially completely closed operating state.

The shift elements K1 to K3 as well as the driving direction shift elements KR and KV are designed as friction-locking load shift elements, by means of which differential rotational speeds nevertheless present in the shift elements K1 to K3 and the driving direction shift elements KR and KV can be equalized during the synchronous range change.

In the present case, the planetary transmission 9 has two sun gears 21, 22, which mesh with common double planet gears 23, which in turn are rotatably supported on a planet carrier 24. The transmission input shaft 7 can be operatively connected to the planet carrier 24 by means of the driving direction shift elements KV and KR and by means of a gear 18, which meshes with a freewheeling gear 19 that can be connected to the auxiliary shaft 13 in a rotationally fixed manner by means of the driving direction shift element KR or with an additional freewheeling gear 20 that can be connected to the transmission input shaft 7 in a rotationally fixed manner by means of the driving direction shift element KV. In addition, the double planet gears 23 mesh with a ring gear 25, which, by means of a fixed gear 26, engages with an additional fixed gear 27 of a hydrostatic shaft 28 of the hydrostatic device 4, the hydrostatic shaft being operatively connected to the second hydraulic unit 11.

In the present case, the first hydrostatic unit 10 is connected to the second sun gear 22 of the planetary transmission 9 in a rotationally fixed manner by means of an additional hydrostatic shaft 29.

In the second driving range, depending on the consumption displacement of the first hydraulic unit 10 or the second hydraulic unit 11 and a pumping displacement of the second hydraulic unit 11 or the first hydraulic unit 10, at least part of the torque provided by the drive machine 2 can be introduced into the second power branch 5 having the mechanical device 6 by means of the planet carrier 24 of the planetary transmission 9 and the double planet gears 23 and the ring gear 25 or by means of the first sun gear 21 of the planetary transmission 9 and a fixed gear 30 connected thereto in a rotationally fixed manner.

On principle, the drive of the drive machine 2 is introduced into the planet carrier 24 of the planetary transmission 9 by means of the driving direction shift element KR or KV in the example embodiment of the transmission device 1 shown in FIG. 1. Proceeding from the planet carrier 24, when the first shift element K1, by means of which the first driving range can be engaged in the transmission device 1, is closed, a part of the drive torque of the drive machine 2 depending on the operating state of the hydrostatic device 4 is introduced into the first hydraulic unit 10 by means of double planet gears 23 and the second sun gear 22, the first hydraulic unit being operated as a pump when the first driving range is engaged. The mechanical driving then occurs by means of the ring gear 25 and the fixed gear 26 connected thereto in a rotationally fixed manner, the fixed gear 26 meshing with the fixed gear 27 of the first hydrostatic shaft 28.

A freewheeling gear 33 can be connected to the auxiliary shaft 14 in a rotationally fixed manner by means of the first shift element K1, whereby the drive torque of the drive machine 2 can be transmitted from a fixed gear 36 of the hydrostatic shaft 28 that meshes with an additional fixed gear 35 to the freewheeling gear 33 of the auxiliary shaft 14 and a fixed gear 34 of the transmission output shaft 8 that meshes therewith.

If the second hydraulic unit 11 then operated as a motor stands still and if the first hydrostatic unit 10 operated as a pump is running at maximum rotational speed, the consumption displacement of the second hydrostatic unit 11 is at a maximum while the pumping displacement of the first hydrostatic unit is equal to zero. The drive power of the drive machine 2 is then transmitted completely hydrostatically by means of the transmission apparatus 1, wherein this corresponds to the first limit of the first driving range.

The second limit of the first driving range, which first driving range can be set by means of the shift element K1, is reached when the first hydraulic unit 10 operated as a pump stands still and the rotational speed of the second hydraulic unit 11 operated as a motor is at a maximum, wherein the consumption displacement of the second hydraulic unit 11 is then equal to zero and the pumping displacement of the first hydraulic unit 10 has a maximum value. In this operating state of the hydrostatic apparatus 4, the drive power of the drive machine 2 is transmitted completely mechanically between the transmission input shaft 7 and the transmission output shaft 8 by means of the transmission device 1.

If there is a corresponding request to engage the second driving range in the transmission device 1, the two hydraulic units 10 and 11 are pivoted until the second shift element K2 is essentially in the synchronous operating state. Then the shift element K2 is closed and at the same time the first shift element K1 is opened. With the second driving range engaged, the first hydraulic unit 10 is operated as a motor and the second hydraulic unit 11 is operated as a pump, whereby the drive torque of the drive machine 2 is at least partially introduced into the second hydrostatic unit 11 by means of the planet carrier 24, the double planet gears 23, the ring gear 25, the fixed gear 26, the additional fixed gear 27, and the hydrostatic shaft 28.

Depending on the pivoting position of the two hydrostatic units 10 and 11, a portion of the drive torque of the drive machine 2 corresponding thereto is transmitted to the first hydrostatic unit 10 and, by means of the hydrostatic shaft 29 and the second sun gear 22, to the double planet gears 23. The second sun gear 22, which likewise meshes with the double planet gears 23, meshes with a freewheeling gear 31 by means of the fixed gear 30, the freewheeling gear 31 being connected to the auxiliary shaft 15 in a rotationally fixed manner in the closed operating state of the second shift element K2. The drive torque of the drive machine 2 is transmitted by means of a fixed gear 32 of the auxiliary shaft 15 to the freewheeling gear 33 of the auxiliary shaft 14 meshing therewith and to the fixed gear 34 of the transmission output shaft 8 engaging in turn therewith.

If, on the other hand, there is a request for a driving range change from the second driving range to the third driving range, the hydrostatic device 4 is adjusted accordingly in order to put the third shift element K3 into a synchronous operating state while the second shift element K2 is still closed. If the third shift element K3 is at least approximately in the synchronous operating state thereof, the third shift element is closed and the second shift element K2 is put into the open operating state thereof, wherein the closing of the third shift element K3 causes a freewheeling gear 37, which meshes with the fixed gear 26 connected to the ring gear 25, to be connected to the auxiliary shaft 16 in a rotationally fixed manner. The torque is transmitted from a fixed gear 38 of the auxiliary shaft 16 to the freewheeling gear 33 of the auxiliary shaft 14 meshing therewith and to the fixed gear 34 of the transmission output shaft 8 engaging in turn therewith. The second hydraulic unit 11 is operated as a motor while the third driving range is engaged, whereas the first hydraulic unit 10 is put into pumping operation as when the first driving range is engaged.

In the first driving range, which can be engaged by means of the first shift element K1, the greatest gear ratio can be set in the transmission device 1, while in the second driving, which can be engaged by means of the second shift element K2, a middle gear ratio range can be set in the transmission device 1 and in the third driving range, which can be engaged by means of the third shift element K3, the smallest gear ratio range can be set in the transmission device 1. The three driving ranges are designed in such a way that the first driving range or gear ratio range and the second gear ratio range overlap and the second gear ratio range and the third gear ratio range overlap and the gear ratios of the transmission device 1 can be varied continuously over the entire gear ratio range of the transmission device 1, which extends from the lower limit of the gear ratio of the first driving range to the upper limit of the gear ratio of the third driving range, without the driver of a vehicle having the transmission device noticing and without an interruption in the traction force.

The transmission device 1, which can be used in the construction machine sector, is a continuously variable transmission, by means of which high traction forces and driving speeds preferably up to 40 km/h can be realized. All shift elements K1 to K3 are arranged on separate auxiliary shafts 14, 15, and 16, whereby the transmission device 1, when used in the construction machine sector with low traction force requirements, can be implemented in a simple manner as a two-range transmission, which is then designed without the third shift element K3, the auxiliary shaft 16, the fixed gear 38, and the freewheeling gear 37. Thus the transmission device 1 provides high modularity and can be provided as a three-range transmission and as a two-range transmission having the same installation space requirement without changing the transmission housing or the connections of the transmission output shaft 8.

Because the three range transitions between the driving ranges can all be synchronously performed in the synchronous operating state of the shift elements K1 to K3, in other words during both upshifting and downshifting among the three driving ranges, designing and dimensioning the shift elements K1 to K3 with lower performance capability is made possible in a simple manner, because only low friction work must be performed by the shift elements K1 to K3 and greatly reduced friction power must be absorbed by the shift elements K1 to K3 in comparison to non-synchronous range changes.

Because the shift elements K1 to K3 are arranged on separate auxiliary shafts 14 to 16 and not on the hydrostatic shaft 28 of the hydrostatic device 4 as in transmission devices known from practice, the power-transmitting components have lower rotational speeds, especially while the third driving range is engaged, whereby the loading of these components is reduced.

Furthermore, in the present case an inner disk carrier 43 of the first shift element K1 can be coupled to the output or the transmission output shaft 8, while an outer disk carrier 42 is connected to the auxiliary shaft 14 in a rotationally fixed manner.

In the first driving range engaged in the transmission device 1, the mechanical power branch 5 transmits torque from the ring gear 25 to the additional fixed gear 27 by means of the fixed gear 26. In this case, a branch-off from the ring gear 25 occurs. The hydrostatic power branch 3 is branched off from the second sun gear 22. The hydrostatic power branch transmits power from the first hydraulic unit 10 to the second hydraulic unit 11. The first hydraulic unit 10 acts as a pump, and the second hydraulic unit acts as a motor. On the first hydrostatic shaft 28, the mechanical power and the hydrostatic power are added and transmitted to the output by means of the fixed gear 36. In the second driving range, the power coming from the planet carrier 24 is partially branched to the ring gear 25 and transmitted to the first hydrostatic shaft 28 for the second hydraulic unit 11 by means of the gears 26 and 27. The hydraulic power is transmitted from the second hydraulic unit 11 to the first hydraulic unit 10. In this case, the first hydraulic unit 10 acts as a motor and the second hydraulic unit acts as a pump. The power is transmitted from the second sun gear 22 to the double planet gear 23 and summed there. The total power is transmitted from the first sun gear 21 and then from the gear 30 to the output. In the third driving range, the power is transmitted as in the first driving range, wherein the total power is transmitted from the gear 26 to the output.

In contrast to the embodiment of the transmission device 1 shown in the drawing, the fixed gears 39, 40, and 41 can also be arranged between the transmission input 7 and the driving direction shift elements KR and KV, whereby the transmission device 1 can be adapted to the installation space available in a vehicle in a simple manner.

The motor-side arrangement of the fixed-gear chain comprising the fixed gears 39 to 41 makes it possible to accommodate the second power tap, which can be coupled to the auxiliary shaft 12, in the existing vehicle installation space in a simple manner. Especially when the transmission device 1 is arranged in a wheel loader vehicle frame, collisions with other vehicle components are minimized, which results in significant advantages.

The gear ratio of the gear pairing of the gears 36 and 35 can be implemented identically, regardless of whether the transmission device 1 is designed as a two-range or three-range transmission, in order to keep the rotational speed differences between the shift element halves of the first shift element K1 in the open operating state as low as possible while the second driving range or third driving range is provided.

The provided transmission capability of the first shift element K1 is as large as possible so that the provided gear ratio of the gear pairing of the gears 36 and 35 can be as large as possible and so that the reverse rotational speeds of the first shift element K1 are kept as low as possible while the second and third driving ranges are provided.

On principle, the gears 35, 33, 31, 32, 37 and 38 provided in the region of the shift elements K1 to K3 can be designed as freewheeling gears or fixed gears depending on the particular application. Furthermore, the gears 37 and 38 of the auxiliary shaft 16 arranged in the region of the third shift element K3 and the gears 35 and 33 of the auxiliary shaft 14 arranged in the region of the first shift element K1 can be engaged in a fixed manner with the gear 26 or a gear meshing therewith or coupled thereto, i.e., in the present case the gear 27 or the gear 36.

REFERENCE CHARACTERS

1 Transmission device
2 Drive machine
2A Motor output shaft
2B Vibration damper
3 First power branch
4 Hydrostatic device
5 Second power branch
6 Mechanical device
7 Transmission input shaft
8 Transmission output shaft
9 Transmission apparatus
10 First hydraulic unit
11 Second hydraulic unit
12 to 16 Auxiliary shaft
17 Transmission pump
18 Gear
19 Freewheeling gear
20 Freewheeling gear
21 First sun gear
22 Second sun gear
23 Double planet gear
24 Planet carrier
25 Ring gear
26 Fixed gear
27 Additional fixed gear
28 First hydrostatic shaft
29 Second hydrostatic shaft
30 Fixed gear
31 Freewheeling gear
32 Fixed gear
33 Fixed gear
34 Fixed gear
35 Freewheeling gear
36 Fixed gear
37 Freewheeling gear
38 Freewheeling gear
39 Fixed gear
40 Fixed gear
41 Fixed gear
42 Outer disk carrier
43 Inner disk carrier
K1 to K3 Shift element
KR, KV Driving direction shift element

The invention claimed is:

1. A transmission device (1) having power splitting, the transmission device (1) comprising:
 a first power branch (3) having at least one hydrostatic device (4) having at least first and second hydrostatic shafts (28, 29) and a second power branch (5) operatively connected thereto by a power splitting device (9),
 at least two driving ranges comprising a forward driving range and a reverse driving range, the forward and the reverse driving ranges being switchable by at least one shift element (K1 to K3) to be disengaged and at least one shift element (K1 to K3) to be engaged,
 each of the shift elements (K1 to K3) being arranged on a separate one of first, second, and third auxiliary shafts (14, 15, 16),
 the third auxiliary shaft (16) providing a third driving range via a third auxiliary shaft gear (37) meshing with a fixed gear (26) that is operatively connected to a ring gear (25) of the power splitting device (9), the power splitting device (9) provided for power splitting and for adding parts of an applied torque, which is transmitted by the power branches, the power splitting device (9) being a transmission apparatus designed as a planetary transmission which has two sun gears (21, 22) which engage with common double planet gears (23) which, in turn, mesh with a ring gear (25), the fixed gear (26) that is operatively connected to the ring gear (25) further meshing with a first fixed gear (27) of the first hydrostatic shaft (28) associated with the hydrostatic device (4), and an additional fixed gear (35) of the first auxiliary shaft (14) meshing with a second fixed gear (36) of the first hydrostatic shaft (28) associated with the hydrostatic device (4).

2. The transmission device according to claim 1, wherein a freewheeling gear (31) that is connectable to the second auxiliary shaft (15) in a rotationally fixed manner by a second shift element (K2), by which the second driving range can be provided in the engaged operating state of the second shift element (K2), meshes with a fixed gear (30) connected in a rotationally fixed manner to the first sun gear (21) of the transmission device (9), and a fixed gear (32) of the second auxiliary shaft (15) is operatively connected to one of the gears (33) of the first auxiliary shaft (14) associated with the first shift element (K1).

3. The transmission device according to claim 1, wherein a fixed gear (39) of a transmission input (7) is connectable to a hydraulic pump of a first working hydraulic system by a fixed gear (40) of a fourth auxiliary shaft (13) and to a hydraulic pump of a second working hydraulic system by a fixed gear (41) of a fifth auxiliary shaft (12).

4. The transmission device according to claim 1, wherein a shift element half (42) of a first shift element (K1), by which the first driving range is provided in the engaged operating state of the first shift element (K1), is operatively connected to a transmission output shaft (8) by a first gear (33) of the first auxiliary shaft (14), and an additional shift element half (43) of the first shift element (K1) is operatively connected to the shaft (28) connected to the at least one hydrostatic device (4) by the additional fixed gear (35) of the first auxiliary shaft (14).

5. The transmission device according to claim 4, wherein the shift element half (42) of a first shift element (K1) is an outer disk carrier (42) that is connected to the first auxiliary shaft (14) associated with the first shift element (K1), while the additional shift element half (42) of a first shift element (K1) is an inner disk carrier (43) that is coupled to a freewheeling gear (33) supported on the first auxiliary shaft (14).

6. The transmission device according to claim 4, wherein the first gear (33) of the first auxiliary shaft (14) can be connected to the first auxiliary shaft (14) in a rotationally fixed manner, by the first shift element (K1), and is operatively connected to the transmission output shaft (8).

7. The transmission device according to claim 1, wherein an additional shift element (K3) arranged on the third auxiliary shaft (16) is designed to selectively facilitate the third driving range.

8. The transmission device according to claim 7, wherein the power of the two power branches (3, 5) is added in the first and the third driving ranges by the first hydrostatic shaft (28) associated with the hydrostatic device (4).

9. The transmission device according to claim 8, wherein a transmission input (7) is operatively connectable to a planet carrier (24) of the planetary transmission (9) by driving direction shift elements (KR, KV).

10. The transmission device according to claim 9, wherein either the fixed gears (39, 40, 41) of the transmission input (7) and the fourth and the fifth auxiliary shafts (13, 12) are arranged between the driving direction shift elements (KR, KV) and the transmission input (7), or the driving direction shift elements (KR, KV) are arranged between the fixed gears (39, 40, 41) of the transmission input (7) and the fourth and the fifth auxiliary shafts (13, 12) and the transmission input (7).

11. The transmission device according to claim 7, wherein the third auxiliary shaft gear (37) is a freewheeling gear that is connectable to the third auxiliary shaft (16) in a rotationally fixed manner by the third shift element (K3), by which the third driving range can be provided in the engaged operating state of the third shift element (K3), is operatively connected to the first fixed gear (27) of the first hydrostatic shaft (28) associated with the hydrostatic device (4), and an additional third auxiliary shaft gear (38) is a fixed gear (38) that is operatively connected to the transmission output shaft (8).

12. A transmission device having power splitting, the transmission device comprising:

first and second power branches, the first power branch comprising at least one hydrostatic device having at least first and second hydrostatic shafts, the second power branch being operatively connected to the first power branch by a power splitting device;

at least first and second shift elements being selectively engaged and disengaged for implementing at least two driving ranges in each of a forward drive and a reverse drive, the first shift element being arranged on a first auxiliary shaft and the second shift element being arranged on a second auxiliary shaft;

a third auxiliary shaft supporting a freewheel gear and providing an additional driving range, the third auxiliary shaft being connectable, via the freewheel gear, to a fixed gear that is operatively connected to a ring gear of the power splitting device;

a first fixed gear of the first hydrostatic shaft engaging the fixed gear that is operatively connected to a ring gear of the power splitting device;

a second fixed gear of the first hydrostatic shaft engaging a fixed gear on the first auxiliary shaft;

the power splitting device facilitating the power splitting and combining of portions of torque which is transmitted by the first and the second power branches; and the power splitting device being a planetary transmission comprising two sun gears, which engage with common double planet gears, the common double planet gears meshing with the ring gear of the power splitting device.

\* \* \* \* \*